(12) United States Patent
Wu

(10) Patent No.: US 11,402,928 B2
(45) Date of Patent: Aug. 2, 2022

(54) MOUSE SWITCHABLE BETWEEN DIFFERENT MODES

(71) Applicant: HEWLETT-PACKARD DEVELOPMENT COMPANY, L.P., Spring, TX (US)

(72) Inventor: Chung-Ying Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/420,712

(22) PCT Filed: Jan. 4, 2019

(86) PCT No.: PCT/US2019/012238
§ 371 (c)(1),
(2) Date: Jul. 5, 2021

(87) PCT Pub. No.: WO2020/142101
PCT Pub. Date: Jul. 9, 2020

(65) Prior Publication Data
US 2021/0389832 A1   Dec. 16, 2021

(51) Int. Cl.
*G06F 3/0354* (2013.01)

(52) U.S. Cl.
CPC .. *G06F 3/03543* (2013.01); *G06F 2203/0332* (2013.01)

(58) Field of Classification Search
CPC ............... G06F 3/03543; G06F 2203/0332
USPC .................................................... 345/163
See application file for complete search history.

(56) References Cited

U.S. PATENT DOCUMENTS

| | | | | |
|---|---|---|---|---|
| 5,648,798 A | * | 7/1997 | Hamling | G06F 3/03543 345/163 |
| 6,154,196 A | * | 11/2000 | Fleck | G06F 3/03543 345/157 |
| 8,279,176 B2 | | 10/2012 | Krah et al. | |
| 9,240,299 B2 | | 1/2016 | Chiang | |
| 2008/0165129 A1 | * | 7/2008 | Tang | G06F 3/03543 345/163 |
| 2011/0260973 A1 | | 10/2011 | Kim | |
| 2011/0310017 A1 | | 12/2011 | Chu | |

FOREIGN PATENT DOCUMENTS

| | | |
|---|---|---|
| CN | 103472932 A | 12/2013 |
| CN | 107765897 A | 3/2018 |
| EP | 0964355 B1 | 4/2003 |
| TW | 201443709 A | 11/2014 |
| TW | 201814449 A | 4/2018 |

* cited by examiner

*Primary Examiner* — Mark Edwards
(74) *Attorney, Agent, or Firm* — Austin Rapp

(57) ABSTRACT

In one example, a mouse may include a base for movement along a horizontal surface, first and second sets of pins disposed in the base, and an upper shell movable relative to the base between multiple mode positions. The upper shell may include a first button and a second button. The first button and the second button may electrically connect to the first set of pins in a first mode position. The first button and the second button may electrically connect to the second set of pins in a second mode position to switch functions of the first button and the second button.

14 Claims, 6 Drawing Sheets

MOUSE SWITCHABLE BETWEEN DIFFERENT MODES

BACKGROUND

A computer mouse may be an input device for an electronic device, such as a personal computer and a notebook. The computer mouse may be movable on a table or desk top to cause corresponding movement of a cursor on a display of the electronic device. Buttons and other devices, such as a scroll dial, on the computer mouse can be operated to interact with the electronic device, for example, to select items on the display indicated by the cursor, open menus, enter commands, launch programs, or control the display. For example, the computer mouse may be used in a right-handed mode in which, for instance, clicking a left mouse button may cause the electronic device to select and change the state of the cursor on the display, and clicking a right mouse button may cause context related menu to be displayed.

BRIEF DESCRIPTION OF THE DRAWINGS

Examples are described in the following detailed description and in reference to the drawings, in which.

DETAILED DESCRIPTION

Figure 1:
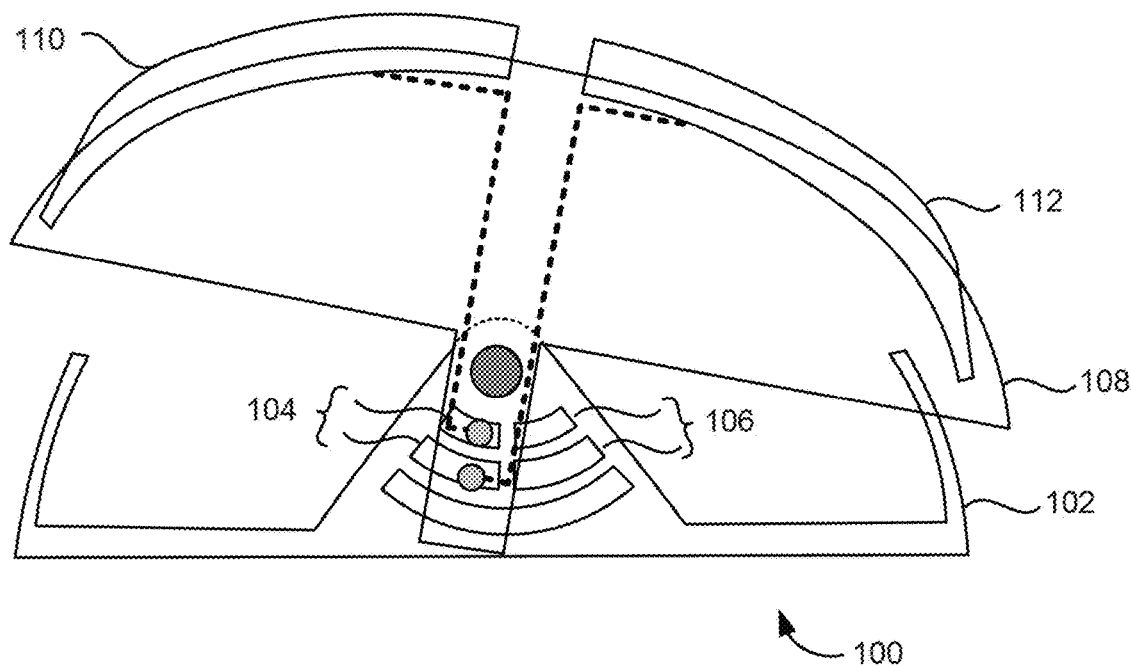
FIG. 1 is a cross-sectional rear view of an example mouse, depicting an upper shell movable relative to a base between multiple mode positions.

A mouse may be an input device for an electronic device, such as a personal computer and a notebook. The mouse may be designed for a right-handed user using default settings. In this mode, pressing or clicking the "left" mouse button may cause the electronic device to select and change the state of the cursor on the display, and pressing or clicking the "right" mouse button may cause context related menu to be displayed. An example method to switch the mouse between the left-handed mode and the right-handed mode may be via a control panel (e.g., a device manager) of the Windows® operating system. Another method is to utilize a program to execute the mouse button switching. However, these methods may be complex and may affect the user experience as such methods may consume time to change the settings and also need knowledge to implement the same.

Some other methods may add a new set of buttons on the mouse. In this example, when the mouse is in the left-hand, the mouse may be operated using a set of left-handed buttons, and when the mouse is in the right-hand, the mouse may be operated using a set of right-handed buttons. In some other examples, a gaming mouse may be provided with multiple buttons (e.g., greater than two), each button may perform a specific command/function. However, these methods may result in an increased number of buttons on the mouse and may also affect the user experience.

Examples described herein may provide a mouse for electronic devices. The mouse may include a base and an upper shell movable (e.g., swingable) relative to the base between multiple mode positions. The mouse may include a first set of pins and a second set of pins disposed in the base. The upper shell may include a first button and a second button. When the upper shell is moved to a first mode position, the first button and the second button may electrically connect to the first set of pins. When the upper shell is moved to a second mode position, the first button and the second button may electrically connect to the second set of pins to switch functions of the first button and the second button.

In one example, the first button and the second button may perform a first function and a second function, respectively, in the first mode position (e.g., a right-handed mode position), and the first button and the second button may perform the second function and the first function, respectively, in the second mode position (e.g., a left-handed mode position). Thus, examples described herein can switch functions of the first button and the second button between the right-handed mode position and the left-handed mode position such that the first function (e.g., a left click functionality) is always assigned to a button underneath the index finger of the current hand intended to be used based on the upper shell position.

In another example, the first button and the second button may perform a first function and a second function, respectively, in the first mode position, and the first button and the second button may perform a third function and a fourth function, respectively, in the second mode position. In this example, the first function, the second function, the third function, and the fourth function can be different. The terms "function" and "command" can be used interchangeably. Thus, examples described herein can use the first button and the second button to perform up to four functions based on the upper shell position.

In yet another example, the mouse may include a third set of pins in addition to the first and second sets of pins. In this example, the upper shell can be movable/swingable to a third mode position to electrically connect the first button and the second button to the third set of pins to perform functions different from that of the first mode position and the second mode position. In this example, the first button and the second button can perform up to six functions based on the upper shell position. Thus, examples described herein can be implemented with two or more sets of pins, each set connecting to the mouse buttons at a particular mode position to provide different functionalities, which can be implemented in a gaming mouse.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described may be included in at least that one example, but not necessarily in other examples.

Referring now to the figures, FIG. 1 is a cross-sectional rear view of an example mouse 100, depicting an upper shell 108 movable relative to a base 102 between multiple mode positions. In some examples, mouse 100 may be an input device for an electronic device. Example electronic device may include a laptop, a convertible device, a notebook, a sub-notebook, a personal gaming device, or the like. Example mouse 100 may be a computer mouse or a gaming mouse.

Mouse 100 may include base 102 for movement along a horizontal surface, for instance, on a table or desk top to cause corresponding movement of a cursor on a display of the electronic device. Further, mouse 100 may include a first set of pins 104 and a second set of pins 106 disposed in base 102. Furthermore, mouse 100 may include upper shell 108 movable relative to base 102 between multiple mode positions. In one example, upper shell 108 may be pivotally connected to base 102 along a pivot axis such that upper shell 108 can be movable (e.g., swingable) relative to base 102 along an arc between the multiple mode positions (e.g., a first mode position and a second mode position). For example, first set of pins 104 and second set of pins 106 may include arc-shaped pins to provide continuous and step-less usage angles.

In one example, upper shell 108 may include a first button 110 and a second button 112 to electrically connect to first set of pins 104 in the first mode position. In another example, first button 110 and second button 112 may electrically connect to second set of pins 106 in a second mode position to switch functions of first button 110 and second button 112. In one example, switching functions of first button 110 and second button 112 may include performing different functions in the first and second mode positions (e.g., as described in FIG. 6B). In another example, functions of first button 110 and second button 112 may be switched between a right-handed mode position and a left-handed mode position such that a left click functionality can be assigned to a button underneath the index finger of the current hand intended to be used based on a position of upper shell 108. An example mechanism for switching the functions of first button 110 and second button 112 may be explained in FIG. 2.

Figure 2:
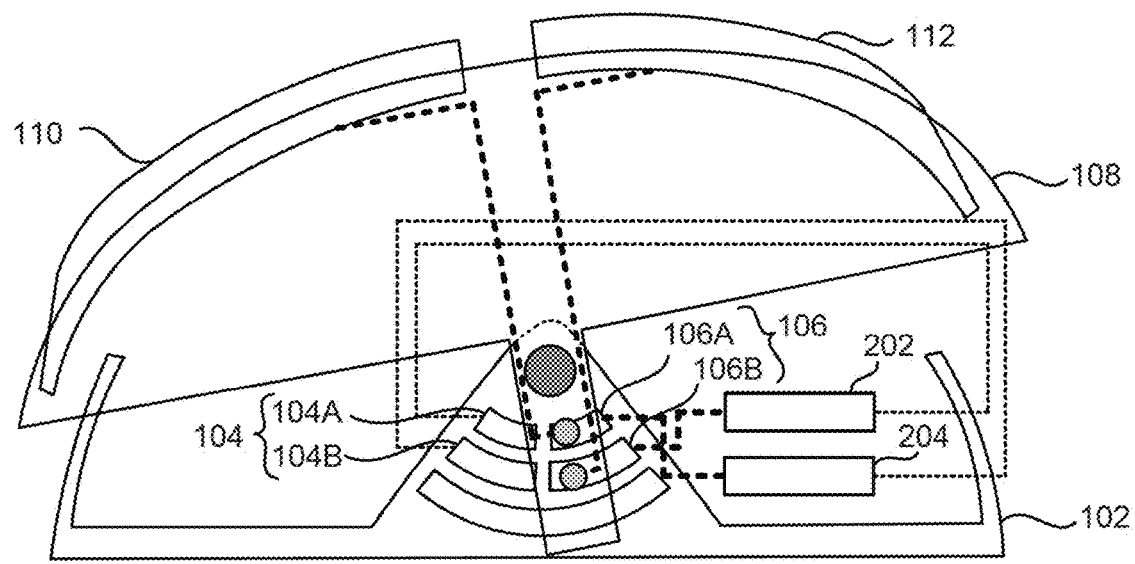
FIG. 2 is a cross-sectional rear view of the example mouse of FIG. 1, depicting an upper shell movable relative to the base between a left-handed mode position and a right-handed mode position.

FIG. 2 is a cross-sectional rear view of example mouse 100 of FIG. 1, depicting upper shell 108 movable relative to base 102 between a left-handed mode position and a right-handed mode position. For example, similarly named elements of FIG. 2 may be similar in structure and/or function to elements described with respect to FIG. 1.

As shown in FIG. 2, mouse 100 may include a first-button input pin 202 and a second-button input pin 204 to receive and process the first and second signals. Further, first set of pins 104 may include a first pin 104A connected to first-button input pin 202 and a second pin 104B connected to second-button input pin 204. Furthermore, second set of pins 106 may include a third pin 106A connected to second-button input pin 204 and a fourth pin 106B connected to first-button input pin 202. First pin 104A, second pin 104B, third pin 106A, and fourth pin 106B may be arc-shaped pins to provide continuous and step-less usage angles.

When upper shell 108 is moved to the right-handed mode position (i.e., the first mode position), first button 110 may electrically connect to first-button input pin 202 via first pin 104A and second button 112 may electrically connect to second-button input pin 204 via second pin 104B. In this example, first button 110 may perform a left click functionality and second button 112 may perform a right click functionality.

When upper shell 108 is moved to the left-handed mode position (i.e., the second mode position), first button 110 may electrically connect to second-button input pin 204 via third pin 106A and second button 112 may electrically connect to first-button input pin 202 via fourth pin 106B. In this example, first button 110 may perform the right click functionality and second button 112 may perform the left click functionality. Thus, upper shell 108 can be movable/swingable relative to base 102 between the left-handed mode position for use by left-handed users and the right-handed mode position for use by right-handed users via electrically connecting first button 110 and second button 112 to either first set of pins 104 or second set of pins 106 based on the mode position.

Figure 3:
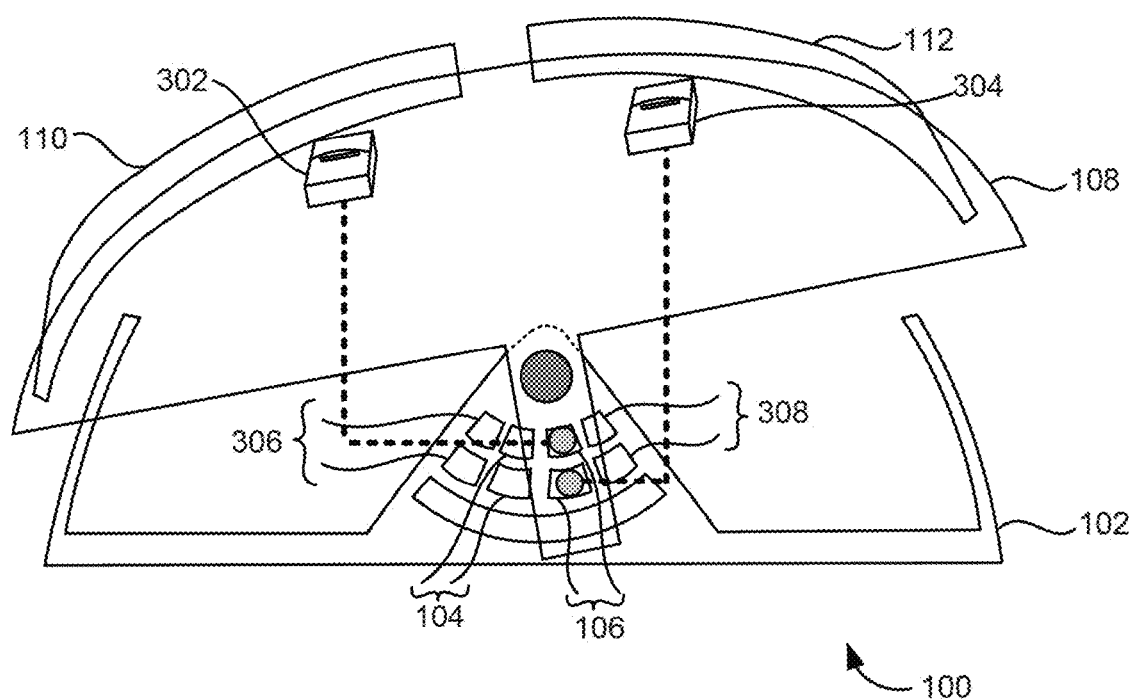
FIG. 3 is a cross-sectional rear view of the example mouse of FIG. 1, depicting additional features.

FIG. 3 is a cross-sectional rear view of example mouse 100 of FIG. 1, depicting additional features. For example, similarly named elements of FIG. 3 may be similar in structure and/or function to elements described with respect to FIG. 1. In the example shown in FIG. 3, upper shell 108 can be movable relative to base 102 between four mode positions.

As shown in FIG. 3, mouse 100 may include a third set of pins 306 and a fourth set of pins 308 disposed in base 102 in addition to first set of pins 104 and second set of pins 106. In this example, upper shell 108 can be movable relative to base 102 to a third mode position and a fourth mode position. For example, first set of pins 104, second set of pins 106, third set of pins 306, and fourth set of pins 308 may include arc-shaped pins to provide continuous and step-less usage angles.

As shown in FIG. 3, mouse 100 may include a first switch 302 disposed below first button 110 and a second switch 304 disposed below second button 112. First switch 302 and second switch 304 can be mechanically coupled to first button 110 and second button 112, respectively. Further, first switch 302 and second switch 304 can be actuated via pressing/clicking first button 110 and second button 112, respectively.

Further as shown in FIG. 3, first button 110 and second button 112 may electrically connect to third set of pins 306 in the third mode position and may electrically connect to fourth set of pins 308 in the fourth mode position to perform functions different from that of the first mode position and the second mode position.

For example, consider that mouse 100 can be implemented as an input device for a gaming device. In this example, first button 110 can be used to trigger a selection of a weapon in the first mode position of upper shell 108, trigger a firing of the weapon in the second mode position of upper shell 108, reload the weapon in the third mode position of upper shell 108, and control zoom option in the fourth mode position of upper shell 108. Thus, first button 110 and second button 112 can perform different functions in different mode positions. Alternately, functions of first button 110 and second button 112 can be switched between the third mode position and the fourth mode position.

Figure 4A:
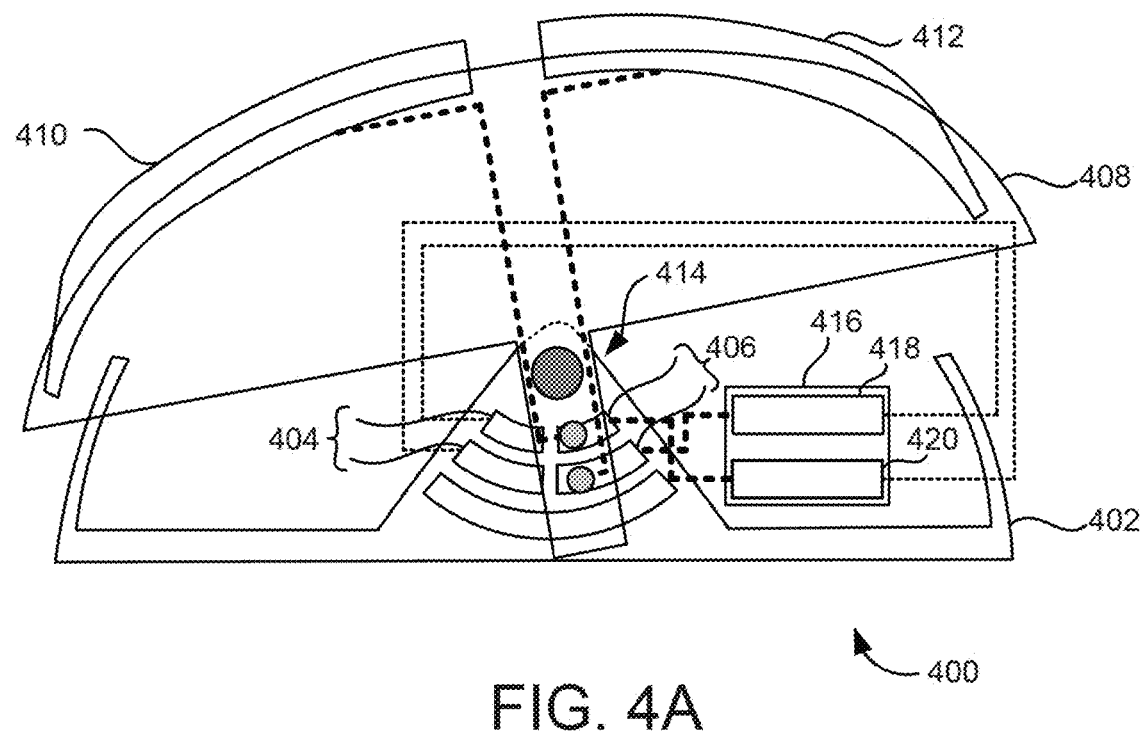
FIG. 4A is a cross-sectional rear view of an example mouse, depicting an example hinge structure to enable pivotal movement of an upper shell relative to a base between a first mode position and a second mode position.

FIG. 4A is a cross-sectional rear view of an example mouse 400, depicting an example hinge structure 414 to enable pivotal movement of an upper shell 408 relative to a base 402 between a first mode position and a second mode position.

Example mouse 400 may include base 402 having a first set of pins 404 and a second set of pins 406. Further, mouse 400 may include upper shell 408 having a first button 410 and a second button 412, when activated, to generate first and second signals, respectively. Furthermore, mouse 400 may include hinge structure 414 to pivotally connect upper shell 408 and base 402 such that upper shell 408 can be swingable along an arc. Also, mouse 400 may include an integrated circuit 416 including a first-button input pin 418 and a second-button input pin 420 to receive and process the first and second signals. Integrated circuit 416 may convert signals inputted through first-button input pin 418 and second-button input pin 420 to a digital data stream that can be sent to the electronic device.

In one example, when upper shell 408 is moved to the first mode position, first set of pins 404 may be connected to first button 410 and second button 412 to transmit the first and second signals to first-button input pin 418 and second-button input pin 420, respectively. When upper shell 408 is moved to the second mode position, second set of pins 406 may be connected to first button 410 and second button 412 to transmit the first and second signals to second-button input pin 420 and first-button input pin 418, respectively (e.g., as shown in FIG. 4A). In this example, the first mode position may correspond to a right-handed mode position for use by right-handed users and the second mode position may correspond to a left-handed mode position for use by left-handed users.

Figure 4B:
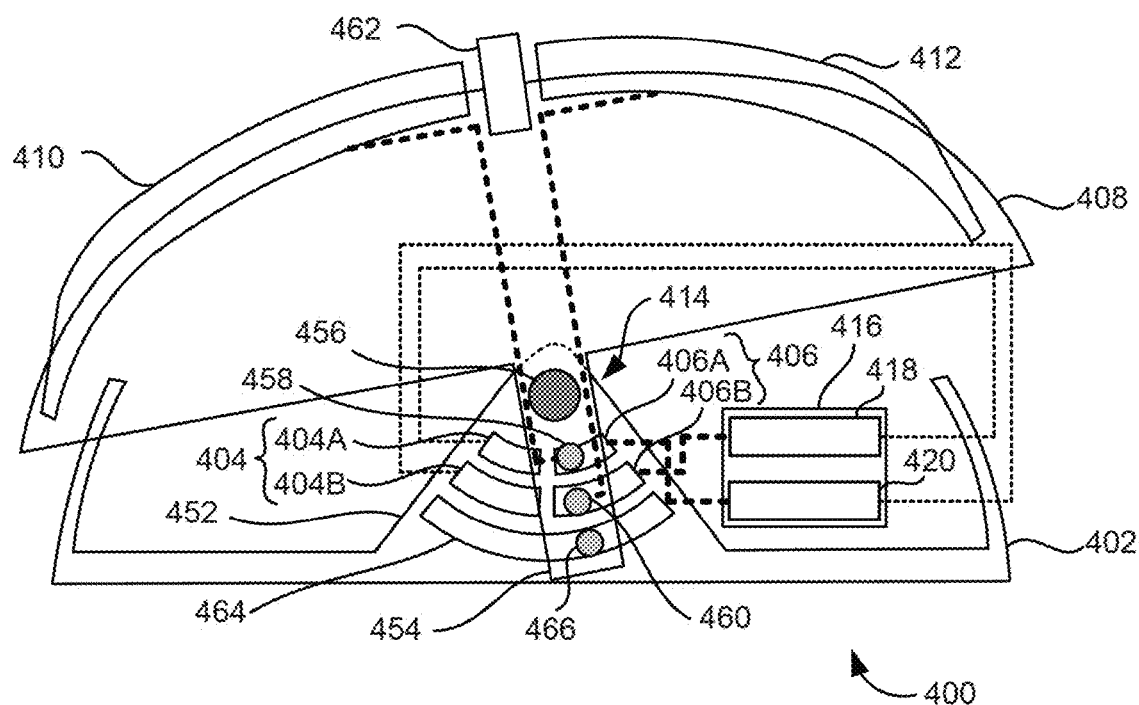
FIG. 4B is a cross-sectional rear view of the example mouse of FIG. 4A, depicting additional features.

FIG. 4B is a cross-sectional rear view of example mouse 400 of FIG. 4A, depicting additional features. For example, similarly named elements of FIG. 4B may be similar in structure and/or function to elements described with respect to FIG. 4A.

As shown in FIG. 4B, hinge structure 414 may include a first holder 452 having a lower portion coupled to base 402. Further, hinge structure 414 may include a second holder 454 having an upper portion coupled to upper shell 408. Furthermore, first and second holders 452 and 454 may include intermediate portions that are coupled rotatably about a pivot axis (e.g., at 456).

In one example, a lower portion of second holder 454 may include a first electrical contact 458 connected to first button 410 and a second electrical contact 460 connected to second button 412. Also, the lower portion of second holder 454 may include a ground contact 466. When upper shell 408 moves to the first mode position, first electrical contact 458 and second electrical contact 460 may connect to first set of pins 404. When upper shell 408 moves to the second mode position (e.g., as shown in FIG. 4B), first electrical contact 458 and second electrical contact 460 may connect to second set of pins 406. For example, first electrical contact 458 and second electrical contact 460 may be fixedly disposed on the lower portion of second holder 454 such that first electrical contact 458 and second electrical contact 460 may move/swing along with second holder 454 to contact either first set of pins 404 or second set of pins 406 based on the mode position of upper shell 408. In the first mode position and the second mode position, ground contact 466 may connect to ground pin 464. In some examples, the angular rotation of upper shell 408 may be limited by mechanical stops designating the positions associated with the first mode position and the second mode position.

In one example, first set of pins 404 may include a first pin 404A connected to first-button input pin 418 and a second pin 404B connected to second-button input pin 420. Further, second set of pins 406 may include a third pin 406A connected to second-button input pin 420 and a fourth pin 406B connected to first-button input pin 418. Furthermore, mouse 400 may include a finger wheel 462 disposed on upper shell 408 and rotatable about a central axis to control a graphical parameter on a display of an electronic device.

In the example shown in FIG. 4B, finger wheel 462 may be disposed about a horizontal axis between first button 410 and second button 412. In other examples, finger wheel 462 can be disposed in any other location such that finger wheel 462 can be accessible in the first and second mode positions. For example, finger wheel 462 can be rotatable about a central vertically aligned axis. In this example, upper shell 408 can be moveable relative to base 402 to selectively expose different portions of finger wheel 462 such that a first portion of finger wheel 462 can be exposed when upper shell 408 is in the first mode position and a second portion of finger wheel 462 can be exposed when upper shell 408 is in the second mode position. For example, finger wheel 462 can be exposed on the side where the user's thumb is to be positioned.

Figure 5:
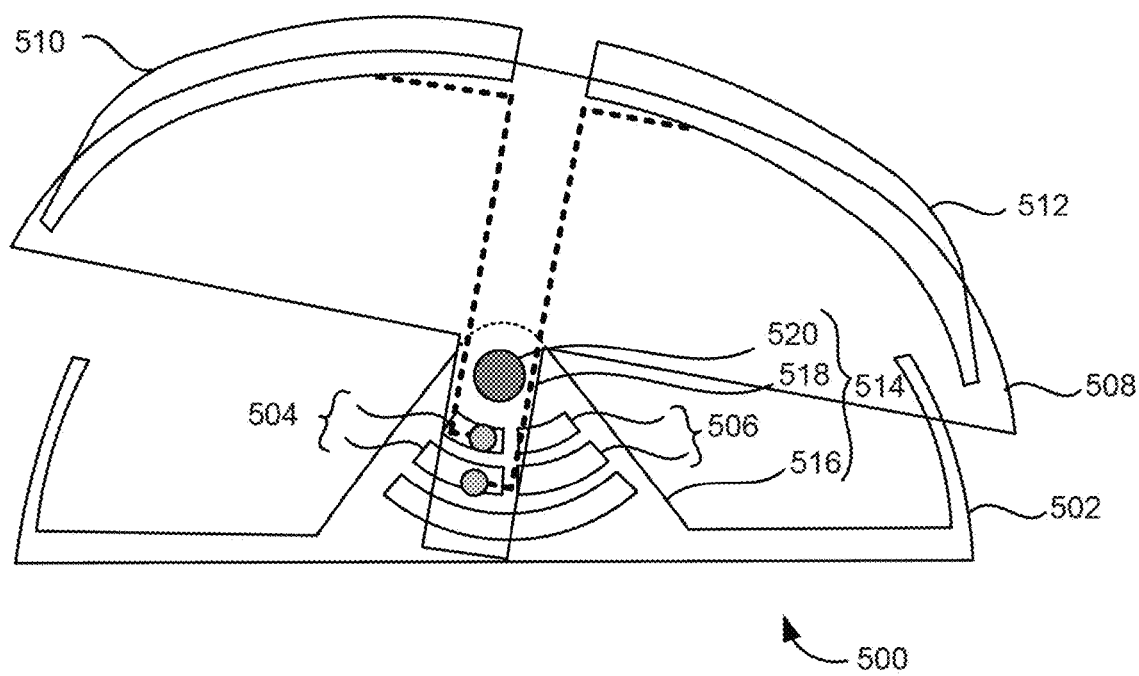
FIG. 5 is a cross-sectional rear view of an example mouse, depicting an example hinge structure to pivotally connect an upper shell and a base to enable the upper shell to move relative to the base between multiple mode positions.

FIG. 5 is a cross-sectional rear view of an example mouse 500, depicting an example hinge structure 514 to pivotally connect an upper shell 508 and a base 502 to enable upper shell 508 to move relative to base 502 between multiple mode positions. Mouse 500 may include base 502 having a first set of pins 504 and a second set of pins 506 disposed therein. Further, mouse 500 may include upper shell 508 having a first button 510 and a second button 512 on a top surface. Furthermore, mouse 500 may include hinge structure 514 to pivotally connect upper shell 508 and base 502 along a pivot axis.

In one example, hinge structure 514 may include a first holder 516 coupled to base 502 and having a first opening. Further, hinge structure 514 may include second holder 518 coupled to upper shell 508 and having a second opening. For example, first holder 516 can be coupled to base 502 and second holder 518 can be coupled to upper shell 508, for instance, using fasteners, glue, or the like. In other examples, first holder 516 and base 502 can be implemented as a single piece structure such that first holder 516 can protrude upwards from an inner surface of base 502. Further, second holder 518 and upper shell 508 can be implemented as a single piece structure such that second holder 518 can protrude downwards from an inner surface of upper shell 508.

Furthermore, hinge structure 514 may include a shaft 520 received through the first opening and the second opening to pivotally connect upper shell 508 and base 502 along the pivot axis. In one example, upper shell 508 may be movable/swingable to a first mode position to electrically connect first button 510 and second button 512 to first set of pins 504. In another example, upper shell 508 may be movable to a second mode position to electrically connect first button 510 and second button 512 to second set of pins 506.

Figure 6A:
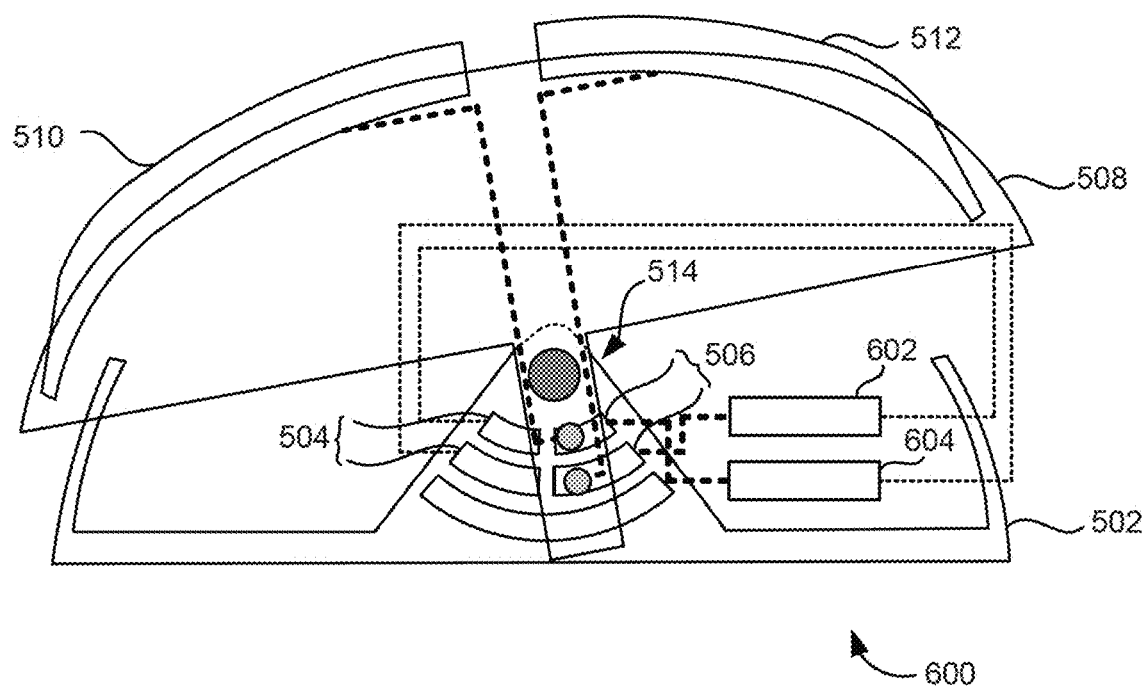
FIG. 6A is a cross-sectional rear view of an example mouse, depicting first and second button input pins to receive and process signals from the first and second buttons respectively, or vice versa based on a mode position.

FIG. 6A is a cross-sectional rear view of an example mouse 600, depicting first and second button input pins 602 and 604 to receive and process signals from first and second buttons 510 and 512, respectively, or vice versa based on a mode position. For example, similarly named elements of FIG. 6A may be similar in structure and/or function to elements described with respect to FIG.

As shown in FIG. 6A, mouse 600 may include first-button input pin 602 and second-button input pin 604 disposed in base 502. When upper shell 508 is moved to the first mode position, first-button input pin 602 and second-button input pin 604 may electrically connect to first button 510 and second button 512, respectively, via first set of pins 504. In this example, first button 510 and second button 512 may perform a first function and a second function, respectively, in the first mode position.

When upper shell 508 is moved to the second mode position (e.g., as shown in FIG. 6A), first-button input pin 602 and second-button input pin 604 may electrically connect to second button 512 and first button 510, respectively, via second set of pins 506. In this example, first button 510 and second button 512 may perform the second function and the first function, respectively, in the second mode position. Thus, mouse 600, as shown in FIG. 5A, can be used by right-handed users in the first mode and by left-handed users in the second mode.

Figure 6B:
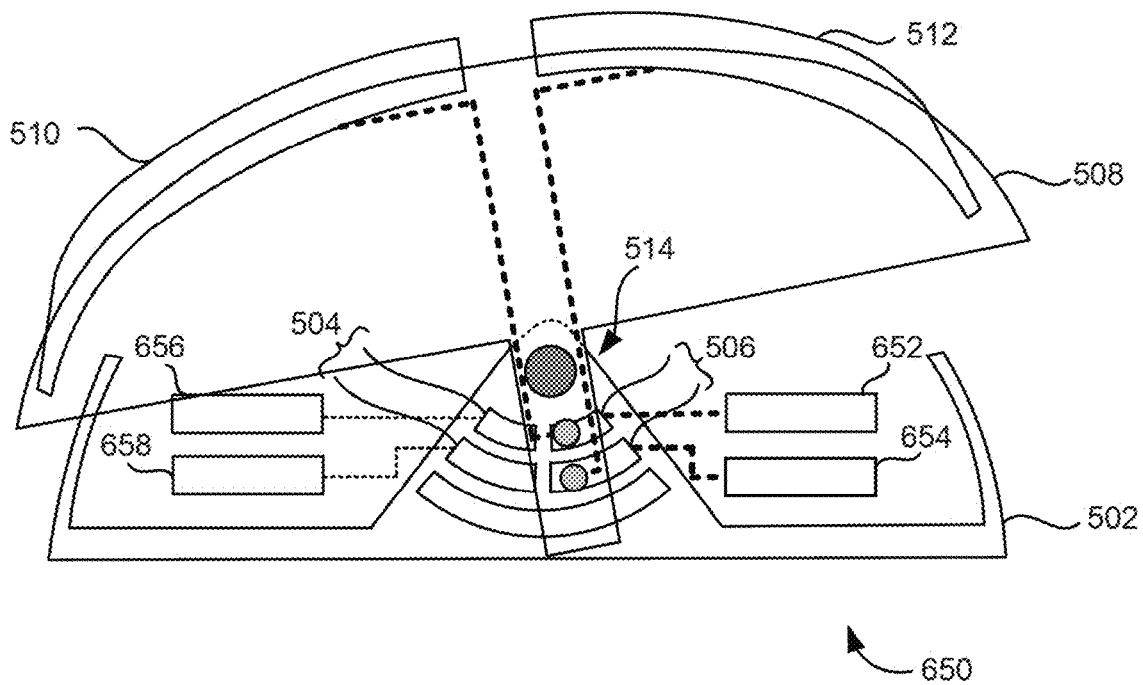
FIG. 6B is a cross-sectional rear view of another example mouse, depicting four button input pins to receive and process signals from the first and second buttons based on a mode position.

FIG. 6B is a cross-sectional rear view of an example mouse 650, depicting four button input pins (e.g., 652, 654, 656, and 658) to receive and process signals from first and second buttons 510 and 512 based on a mode position. For example, similarly named elements of FIG. 6B may be similar in structure and/or function to elements described with respect to FIG. 5.

As shown in FIG. 6B, mouse 650 may include a first-button input pin 652, a second-button input pin 654, a third-button input pin 656, and a fourth-button input pin 658 disposed in base 502 to receive and process signals from a corresponding one of first button 510 and second button 512 based on the first mode position or the second mode position of upper shell 508.

When upper shell 508 is moved to the first mode position, third-button input pin 656 and fourth-button input pin 658 may electrically connect to first button 510 and second button 512, respectively, via first set of pins 504. In this example, first button 510 and second button 512 may perform a first function and a second function, respectively.

When upper shell 508 is moved to the second mode position, first-button input pin 652 and second-button input pin 654 may electrically connect to first button 510 and second button 512, respectively, via second set of pins 506. In this example, first button 510 and second button 512 may perform a third function and a fourth function, respectively, in the second mode position. In one example, the first function, the second function, the third function, and the fourth function may be different. Thus, mouse 650, as shown in FIG. 5B, can be used for a gaming device where first button 510 and second button 512 can be used to perform up to four functions based on a mode position of upper shell 508.

Figure 7:
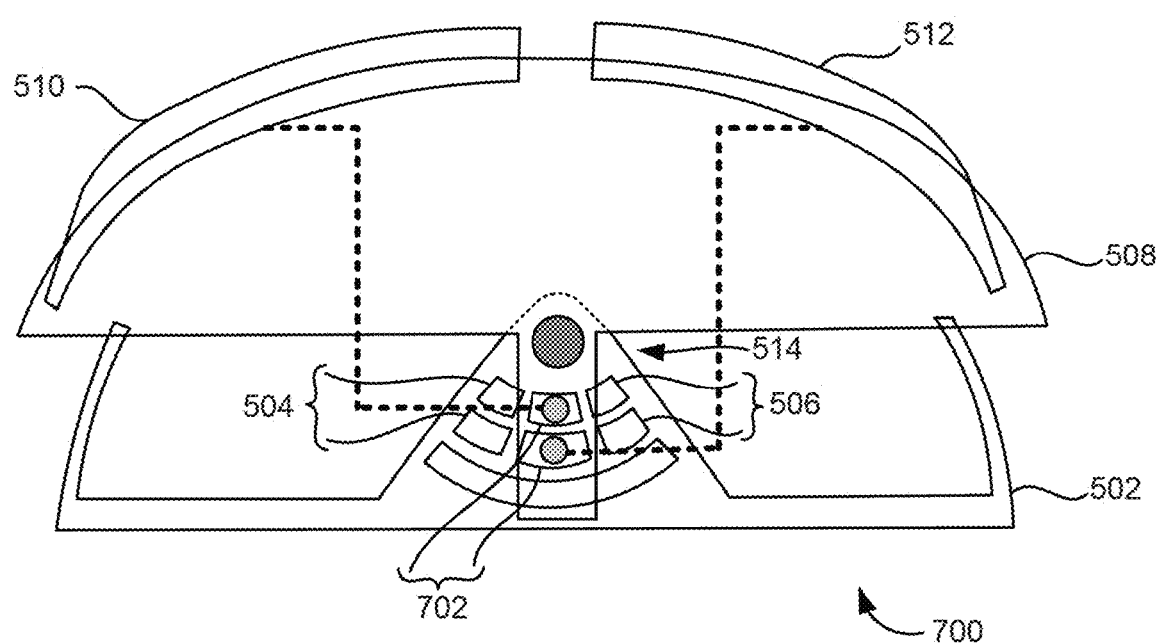
FIG. 7 is a cross-sectional rear view of yet another example mouse, depicting an upper shell movable relative to a base between three mode positions.

FIG. 7 is a cross-sectional rear view of yet another example mouse 700, depicting upper shell 508 movable relative to base 502 between three mode positions. For example, similarly named elements of FIG. 7 may be similar in structure and/or function to elements described with respect to FIG. 5.

As shown in FIG. 7, mouse 700 may include a third set of pins 702 disposed in base 502. In one example, third set of pins 702 may be disposed between first set of pins 504 and second set of pins 506 such that first button 510 and second button 512 may electrically connect to third set of pins 702 when upper shell 508 is in a third mode position (e.g., a neutral position). Neutral position may refer to a position of outer shell 508 between the first mode and the second mode such that edges of upper shell may be approximately equally spaced from the horizontal surface of a table or desk top. In some examples, the angular rotation of upper shell 508 may be limited by mechanical stops designating the positions associated with the first mode position, the second mode position, and the third mode position.

In one example, upper shell 508 can be movable/swingable to the third mode position to electrically connect first button 510 and second button 512 to third set of pins 702 to perform functions different from that of the first mode position and the second mode position. In some examples, the functions of first button 510 and second button 512 in the third mode position can be common for left-handed users and right-handed users, while the functions of first button 510 and second button 512 can be switched between the first mode position and the second mode position as shown in FIG. 6A. In other examples, mouse 700, as shown in FIG. 7, can be used for a gaming device where first button 510 and second button 512 can be used to perform up to six functions based on a mode position of upper shell 508. In this example, each set of pins 504, 506, and 702 can perform different functions.

Figure 8:
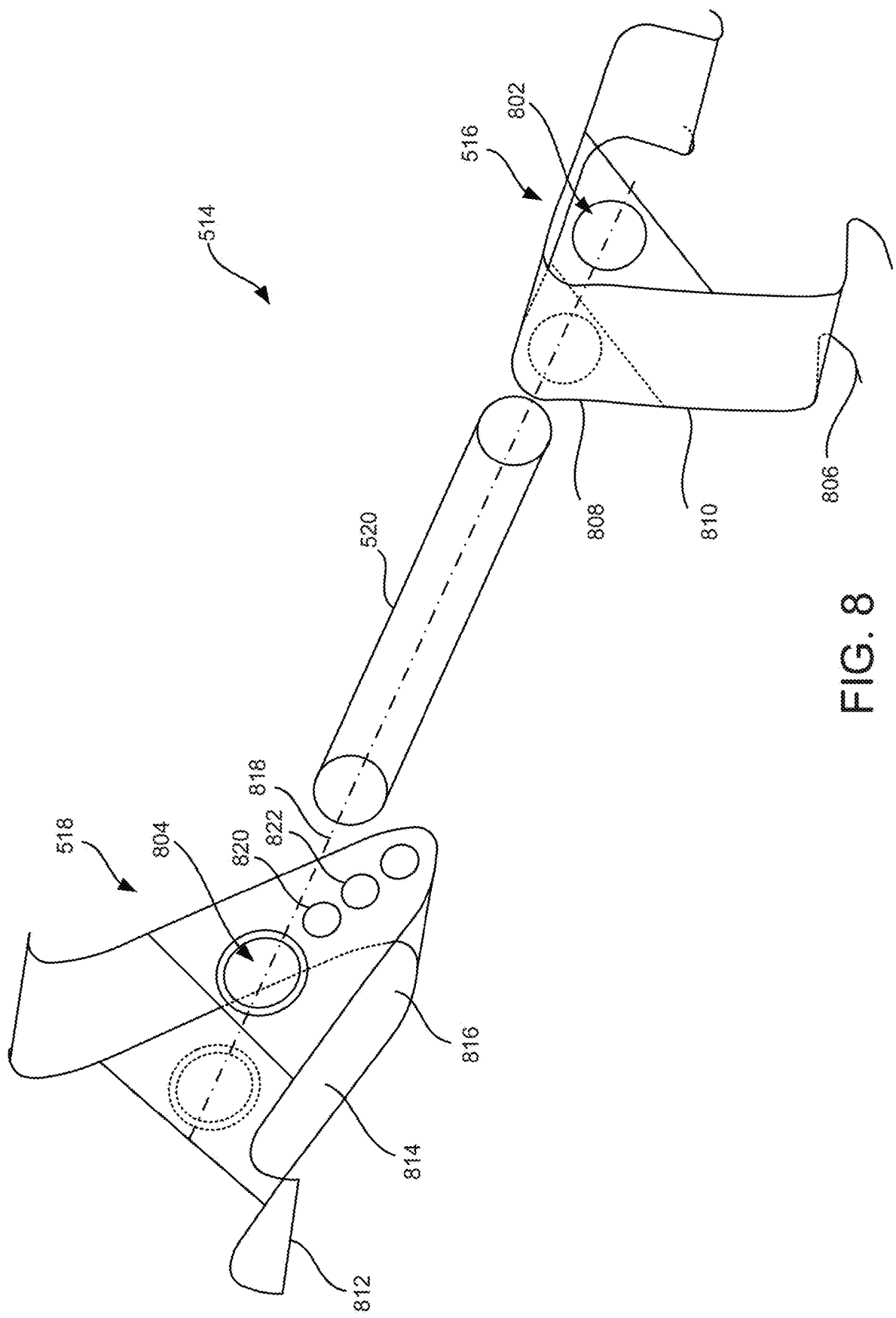
FIG. 8 is a schematic view of the example hinge structure of FIG. 5.

FIG. 8 is a schematic view of example hinge structure 514 of FIG. 5. For example, similarly named elements of FIG. 8 may be similar in structure and/or function to elements described with respect to FIG. 5. As shown in FIG. 8, first holder 516 may include a lower portion 806 that can be coupled to base 502, an upper portion 808, and an intermediate portion 810. In some examples, a first opening 802 can be defined at upper portion 808, intermediate portion 810, or therebetween. Further, second holder 518 may include an upper portion 812 that can be coupled to upper shell 508, an intermediate portion 814, and a lower portion 816. In some examples, a second opening 804 can be defined at upper portion 812, intermediate portion 814, or therebetween. Further, shaft 520 may be received through first opening 802 and second opening 804 to pivotally connect upper shell 508 and base 502 along a pivot axis 818. Hinge structure 514 depicted in FIG. 8 is an example, however, any other hinge structure can be implemented such that first button 510 and second button 512 can connect to one of the multiple sets of pins during movement of upper shell 508 relative to base 502.

Further, a first electrical contact 820 that can be connected to first button 510 and a second electrical contact 822 that can be connected to second button 512 may be disposed on lower portion 816 of second holder 518. Further, multiple sets of pins (e.g., 504, 506, 702, and the like) can be disposed between first holder 516 and second holder 518. First electrical contact 820 and second electrical contact 822 can swing with upper shell 508 along the axis such that first electrical contact 820 and second electrical contact 822 can contact one of the multiple sets of pins disposed therein based on the mode position of upper shell 508.

Examples described herein may provide a mechanical solution to switch functions of mouse buttons, and hence may not need any programming and/or device setting modifications to switch the mouse between the left-handed mode and the right-handed mode usage. Also, examples described herein may eliminate the involvement of a sensor to switch the mouse between the left-handed mode and the right-handed mode usage. Examples described herein may provide an ergonomically designed mouse, that can be comfortable to both left and right-handed users with an enhanced user experience.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on," as used herein, means "based at least in part on," Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A mouse comprising:
a base for movement along a horizontal surface;
first and second sets of pins disposed in the base;
an upper shell movable relative to the base between multiple mode positions, wherein the upper shell comprises:
a first button and a second button to electrically connect to the first set of pins in a first mode position, and wherein the first button and the second button are to electrically connect to the second set of pins in a second mode position to switch functions of the first button and the second button; and
wherein the upper shell is pivotally connected to the base along a pivot axis such that the upper shell is movable relative to the base along an arc between the first mode position and the second mode position, and wherein an angular rotation of the upper shell is limited by mechanical stops designating the first mode position and the second mode position.

2. The mouse of claim 1, wherein the first set of pins comprises a first pin connected to a first-button input pin and a second pin connected to a second-button input pin, and wherein the second set of pins comprises a third pin connected to the second-button input pin and a fourth pin connected to the first-button input pin.

3. The mouse of claim 2, wherein the first button is to electrically connect to the first-button input pin via the first pin and the second button is to electrically connect to the second-button input pin via the second pin in the first mode position, and wherein the first button is to electrically connect to the second-button input pin via the third pin and the second button is to electrically connect to the first-button input pin via the fourth pin in the second mode position.

4. The mouse of claim 1, further comprising:
a third set of pins and a fourth set of pins disposed in the base, wherein the first button and the second button are to electrically connect to the third set of pins in a third mode position and to electrically connect to the fourth set of pins in a fourth mode position to perform functions different from that of the first mode position and the second mode position.

5. A mouse comprising:
a base having first and second sets of pins;
an upper shell having first and second buttons, when activated, to generate first and second signals, respectively;
a hinge structure to pivotally connect the upper shell and the base; and
an integrated circuit comprising first-button and second-button input pins to receive and process the first and second signals,
wherein when the upper shell is moved to a first mode position, the first set of pins are connected to the first and second buttons to transmit the first and second signals to the first-button and second-button input pins, respectively, and
wherein when the upper shell is moved to a second mode position, the second set of pins are connected to the first and second buttons to transmit the first and second signals to the second-button and first-button input pins, respectively; and
wherein the upper shell is pivotally connected to the base along a pivot axis such that the upper shell is movable relative to the base along an arc between the first mode position and the second mode position, and wherein an angular rotation of the upper shell is limited by mechanical stops designating the first mode position and the second mode position.

6. The mouse of claim 5, wherein the hinge structure comprises:
a first holder having a lower portion coupled to the base;
a second holder having an upper portion coupled to the upper shell, and wherein the first and second holders comprise intermediate portions that are coupled rotatably about a pivot axis.

7. The mouse of claim 6, wherein a lower portion of the second holder further comprises:
a first electrical contact connected to the first button; and
a second electrical contact connected to the second button, wherein the first electrical contact and the second electrical contact are to connect to the first set of pins in the first mode position, and wherein the first electrical contact and the second electrical contact are to connect to the second set of pins in the second mode position.

8. The mouse of claim 5, wherein the first set of pins comprises a first pin connected to the first-button input pin and a second pin connected to the second-button input pin, and wherein the second set of pins comprises a third pin connected to the second-button input pin and a fourth pin connected to the first-button input pin.

9. A mouse comprising:
a base having first and second sets of pins disposed therein;
an upper shell comprising a first button and a second button; and
a hinge structure comprising:
a first holder coupled to the base and having a first opening;
a second holder coupled to the upper shell and having a second opening; and
a shaft received through the first opening and the second opening to pivotally connect the upper shell and the base along a pivot axis, wherein the upper shell is movable to a first mode position to electrically connect the first button and the second button to the first set of pins, and wherein the upper shell is movable to a second mode position to electrically connect the first button and the second button to the second set of pins; and wherein the upper shell is movable relative to the base along an arc between the first mode position and the second mode position, and wherein an angular rotation of the upper shell is limited by mechanical stops designating the first mode position and the second mode position.

10. The mouse of claim 9, wherein the first button and the second button are to perform a first function and a second function, respectively, in the first mode position, and wherein the first button and the second button are to perform the second function and the first function, respectively, in the second mode position.

11. The mouse of claim 9, wherein the first button and the second button are to perform a first function and a second function, respectively, in the first mode position, wherein the first button and the second button are to perform a third function and a fourth function, respectively, in the second mode position, and wherein the first function, the second function, the third function, and the fourth function are different.

12. The mouse of claim 9, further comprising:
a first-button input pin and a second-button input pin disposed in the base to receive and process signals from the first button and the second button respectively, or vice versa based on the first mode position or the second mode position.

13. The mouse of claim 12, wherein the first-button input pin and the second-button input pin are to electrically connect to the first button and the second button, respectively, via the first set of pins in the first mode position, and wherein the first-button input pin and the second-button input pin are to electrically connect to the second button and the first button, respectively, via the second set of pins in the second mode position.

14. The mouse of claim 9, further comprising:
a third set of pins disposed in the base, wherein the upper shell is movable to a third mode position to electrically connect the first button and the second button to the third set of pins to perform functions different from that of the first mode position and the second mode position.

* * * * *